(12) United States Patent
Marchon et al.

(10) Patent No.: US 8,687,323 B2
(45) Date of Patent: Apr. 1, 2014

(54) MAGNETIC MEDIA DISK ANTICORROSION OVERCOAT WITH TITANIUM AND SILICON BASED LAYERS

(75) Inventors: Bruno Marchon, Palo Alto, CA (US);
Daryl J. Pocker, San Jose, CA (US);
Franck D. Rose, San Jose, CA (US);
Qi-Fan Xiao, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 140 days.

(21) Appl. No.: 13/271,712

(22) Filed: Oct. 12, 2011

(65) Prior Publication Data

US 2013/0094109 A1 Apr. 18, 2013

(51) Int. Cl.
*G11B 5/72* (2006.01)

(52) U.S. Cl.
USPC .......................................... 360/135

(58) Field of Classification Search
USPC .......................................... 360/135
See application file for complete search history.

(56) References Cited

U.S. PATENT DOCUMENTS

| | | | |
|---|---|---|---|
| 4,647,494 A | 3/1987 | Meyerson et al. | |
| 5,453,168 A | 9/1995 | Nelson et al. | |
| 5,571,595 A | 11/1996 | Chiba et al. | |
| 5,672,425 A | 9/1997 | Sato et al. | |
| 6,136,421 A | 10/2000 | Chen | |
| 6,322,880 B1 | 11/2001 | Chen | |
| 6,537,686 B1 | 3/2003 | Chen | |
| 6,572,958 B1 | 6/2003 | Chour et al. | |
| 6,586,070 B1 | 7/2003 | Dai et al. | |
| 7,758,982 B2 | 7/2010 | Dai et al. | |
| 2003/0228496 A1* | 12/2003 | Fujimaki et al. | 428/694 TC |
| 2003/0228497 A1 | 12/2003 | Wu et al. | |
| 2006/0029806 A1* | 2/2006 | Hyodo et al. | 428/408 |
| 2007/0054153 A1 | 3/2007 | Dai et al. | |
| 2008/0187781 A1 | 8/2008 | Cheng et al. | |

FOREIGN PATENT DOCUMENTS

| | | | | |
|---|---|---|---|---|
| JP | 54-34602 B2 | * | 10/1979 | ............... G11B 5/72 |
| JP | 59045636 A | | 3/1984 | |
| JP | 60013325 A | | 1/1985 | |
| JP | 61144728 A | | 7/1986 | |
| JP | 02-168419 A | * | 6/1990 | ............... G11B 5/72 |

OTHER PUBLICATIONS

Lee, Kitty W. et al., "Nanolayer Coatings for Hard Disk and Demanding Tribological Applications," Research Summary: Nanomaterials; Sep. 2002; pp. 49, 50 and 52.

* cited by examiner

*Primary Examiner* — Craig A. Renner

(57) ABSTRACT

A magnetic media disk has a substrate; a recording magnetic media on the substrate; and an overcoat on the recording magnetic media, the overcoat comprising a Si-based layer on the recording magnetic media, and a Ti-based layer on the Si-based layer. The magnetic media disk may be rotatably mounted to an enclosure in a hard disk drive.

11 Claims, 4 Drawing Sheets

MAGNETIC MEDIA DISK ANTICORROSION OVERCOAT WITH TITANIUM AND SILICON BASED LAYERS

BACKGROUND OF THE INVENTION

1. Field of the Disclosure

The present invention relates in general to disk drives and, in particular, to a system, method and apparatus for an anticorrosion overcoat for magnetic media disks.

2. Description of the Related Art

Magnetic media disks in hard disk drives typically utilize an overcoat to protect them from corrosion. Currently, materials such as amorphous diamond-like carbon (DLC) and carbon-based materials such as $CN_x$ are used to provide ultrathin overcoats (e.g., less than 30 Å). However, amorphous silicon-based materials such as SiN, TiSiN, SiC and SiCN are prospective candidates to replace conventional overcoat materials. At reduced thicknesses, such Si materials exhibit better anticorrosion performances than carbon materials.

Unfortunately, the surfaces of Si materials are chemically unstable in humidity. This problem impairs their use as ultrathin disk overcoats. For example, when such overcoats are exposed to water vapor from ambient air, a hydrolysis reaction takes place on the surface of Si-based materials. This results in the growth of a thin film of silicon oxide ($SiO_x$) at the film-air interface. $SiO_x$ formation on Si-based overcoat surfaces causes hard disk drive failures such as head crashes and irreversible disk damages. Thus, improvements in disk overcoats continue to be of interest.

SUMMARY

Embodiments of a system, method and apparatus for an anticorrosion overcoat are disclosed. A magnetic media disk may comprise a substrate; a recording magnetic media on the substrate; and an overcoat on the recording magnetic media, the overcoat comprising a Si-based layer on the recording magnetic media, and a Ti-based layer on the Si-based layer.

Embodiments of a hard disk drive may comprise an enclosure; a magnetic media disk rotatably mounted to the enclosure and having a substrate, a recording magnetic media on the substrate, and an overcoat on the recording magnetic media, the overcoat comprising a Si-based layer on the recording magnetic media, and a Ti-based layer on the Si-based layer; and an actuator pivotally mounted to the enclosure and having a head configured to read data from the magnetic media disk.

In another embodiment, an apparatus other than a magnetic media disk may comprise a substrate; a corrosive film on the substrate; and an overcoat on the corrosive film, the overcoat comprising a Si-based layer on the corrosive film, and a Ti-based layer on the Si-based layer.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system, method and apparatus for an anticorrosion overcoat are disclosed. These overcoats are well suited to provide ultrathin protection for and prevent the degradation of many types of corrosive films.

Figure 1:
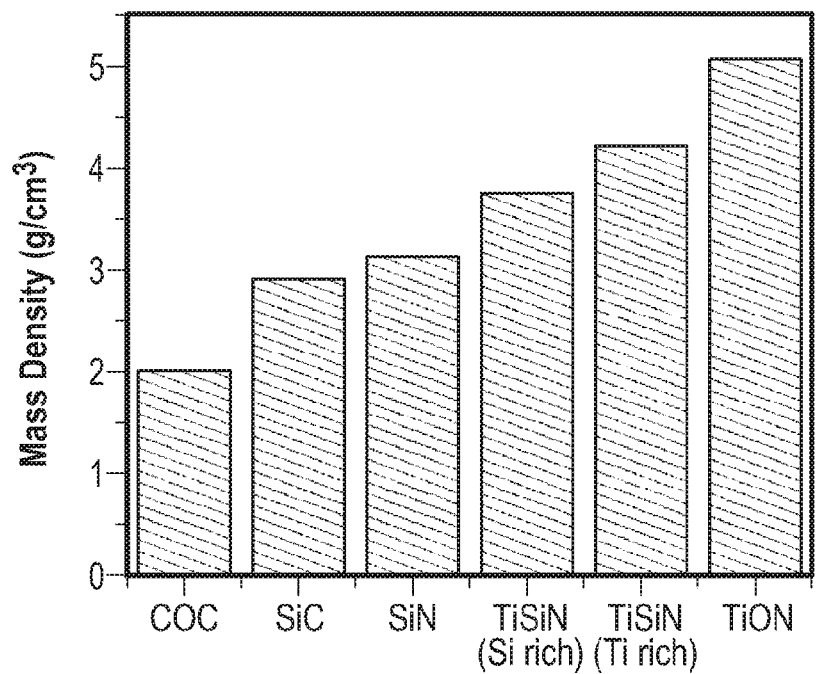
FIG. 1 plots the mass densities of various types of overcoats.

FIG. 1 depicts mass density measurements of various types of overcoat materials. The measurements were obtained by x-ray reflectivity (XRR) on materials having a thickness of about 150 Å. The overcoat materials tested include SiC, SiN, TiSiN (e.g., Si rich and Ti rich), and TiON. Each of these materials is more dense than conventional carbon overcoats. The high densities of these thin films (relative to their bulk density) qualify these materials as prospective candidates for ultrathin overcoats on corrosive films, such as media disks.

Figure 2:
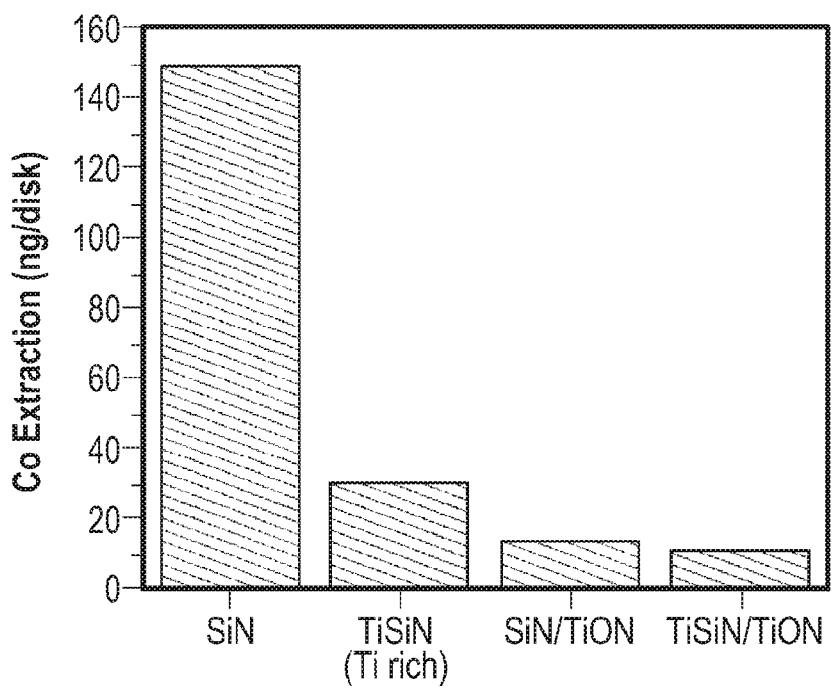
FIG. 2 plots the cobalt extraction of various types of overcoats.

The high densities of these materials indicate that they can be used as barriers against, for example, cobalt diffusion. In this regard, FIG. 2 illustrates Co extraction measurements on magnetic media covered by various types of overcoats. In this experiment each of the overcoats had a thickness of about 25 Å. It is evident that TiSiN acts as a better barrier than SiN because of its higher mass density (see, e.g., FIG. 1). In the two examples on the right of FIG. 2, the top approximately 12 Å of SiN and TiSiN, respectively, were replaced by TiON, which is a denser material than those types (again see FIG. 1). These bilayer combinations of overcoats also result in improved diffusion barriers.

Figure 3:
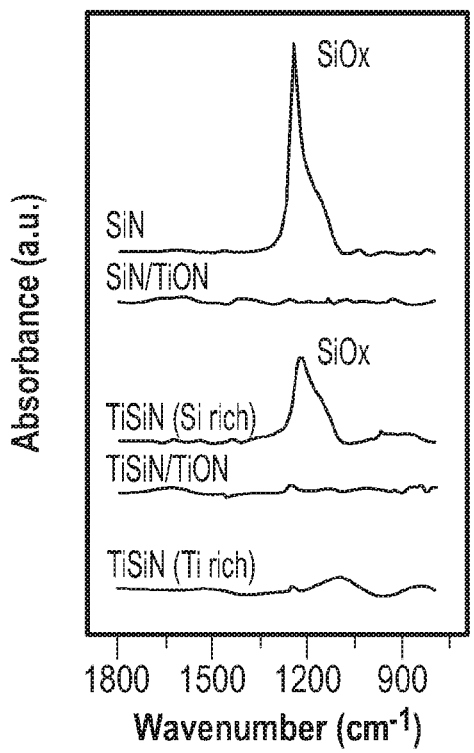
FIG. 3 plots the growth of oxides on various types of overcoats.

Silicon oxide growth on the surface of SiN and TiSiN may be prevented by either increasing the Ti content in the film (i.e., Ti rich), or by replacing the upper portions of respective ones of the films with a layer of TiON. FIG. 3 shows the growth of $SiO_x$ measured by Fourier transform infrared spectroscopy (FTIR) after exposing films having thicknesses of about 25 Å to high temperature and humidity (i.e., a hydrolysis test). It is readily observed that the intensity of the $SiO_x$ band decreases with increasing Ti content. No $SiO_x$ is formed on the films protected by a top capping layer of TiON. In these examples, the total thickness of the bilayers is about 25 Å, with about 13 Å of SiN or TiSiN, capped with about 12 Å of TiON. Other thicknesses also may be provided as described elsewhere herein.

Figure 4:
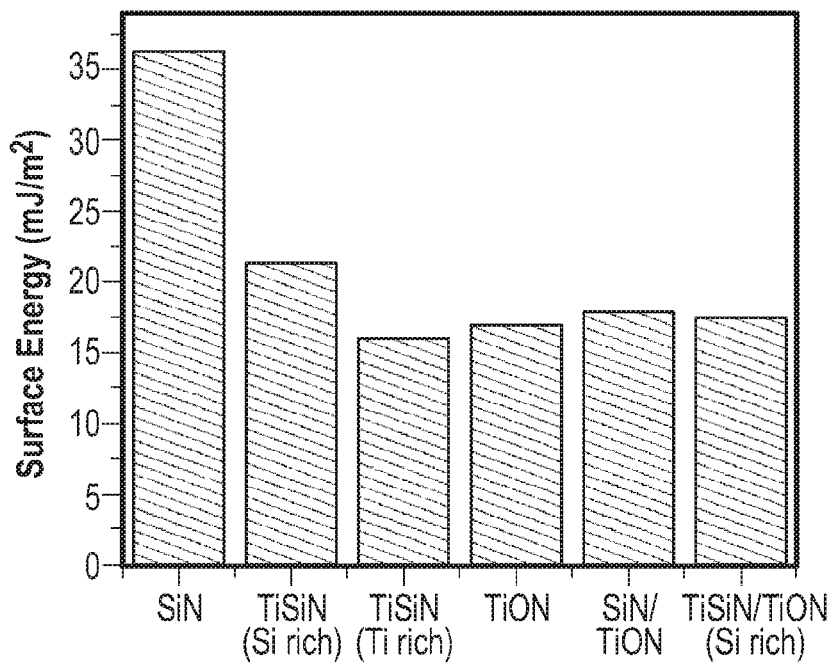
FIG. 4 plots surface energy for various types of overcoats.

Surface energy also was measured on these same films by the droplets (e.g., water and hexadecane) contact angle method. As shown in FIG. 4, increasing the Ti content in the films decreases the surface energy. Replacing the respective upper portions of the Si-based layers with a Ti-based layer also decreases the surface energy of the overcoats.

Figure 5B:
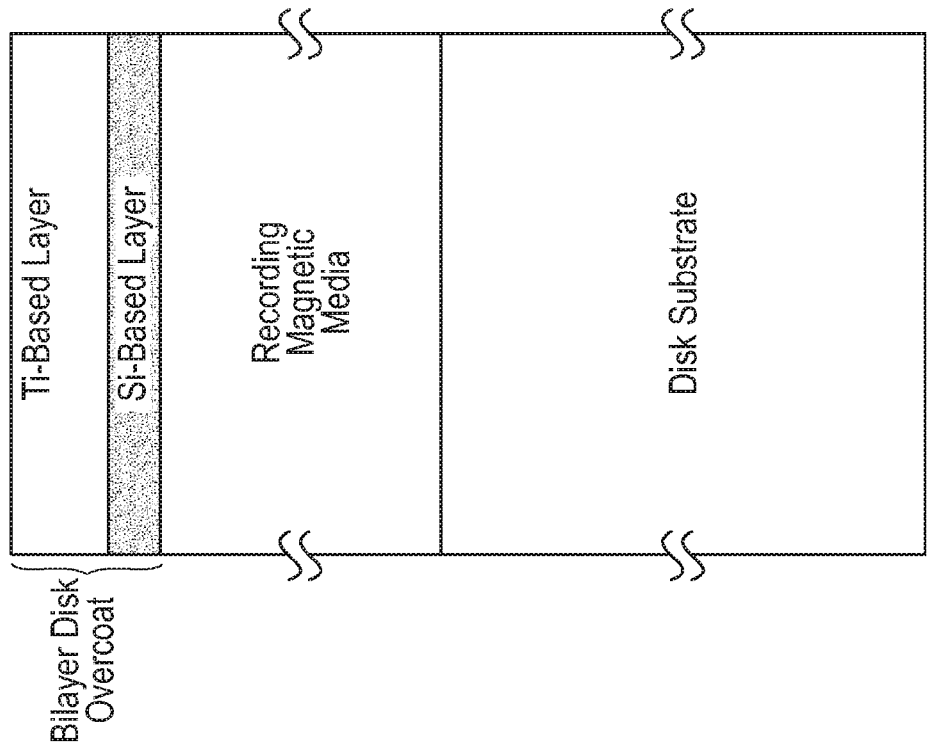
FIGS. 5A and 5B depict schematic sectional views of embodiments magnetic media disks.
Figure 5A:
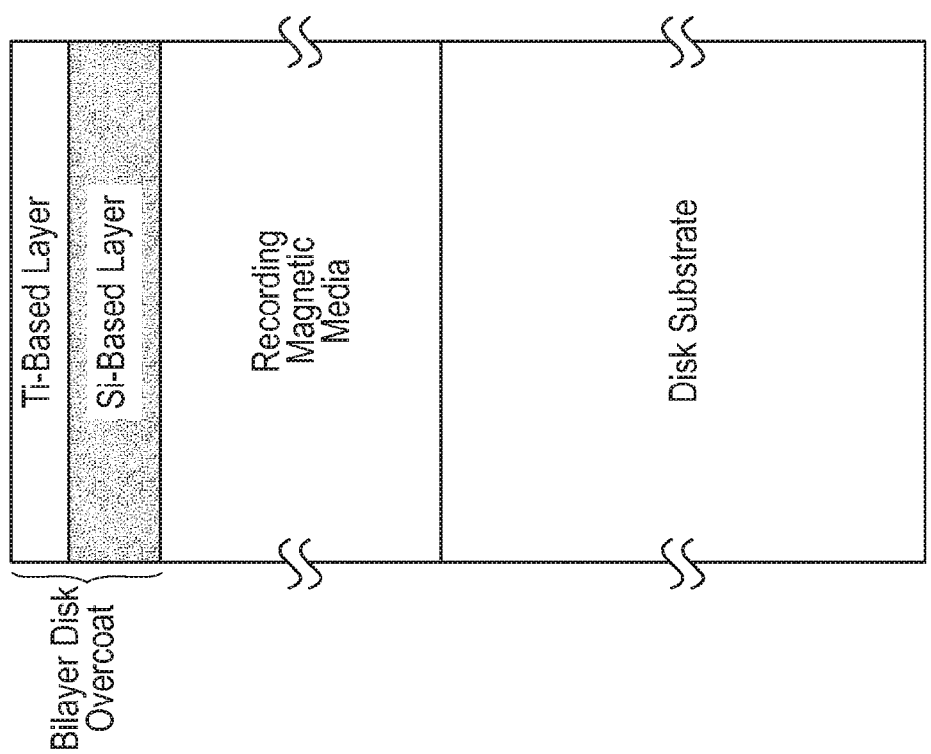

FIG. 5 depicts embodiments of two types of disk overcoat bilayers. These may comprise a Si-based diffusion barrier layer (e.g., bottom layer formed from amorphous SiN, TiSiN, SiC or SiCN), and a Ti-based oxidation barrier layer (e.g., top layer made of amorphous $TiO_x$ or TiON). Depending on their atomic compositions, the thicknesses of each layer may be determined in order for the Si-based layer to prevent Co diffusion, and for the Ti-based layer to prevent oxidation of the Si-based layer. In FIG. 5A, the Si-based layer is thicker than the Ti-based layer, and in FIG. 5B the Ti-based layer is thicker than the Si-based layer.

Figure 6:
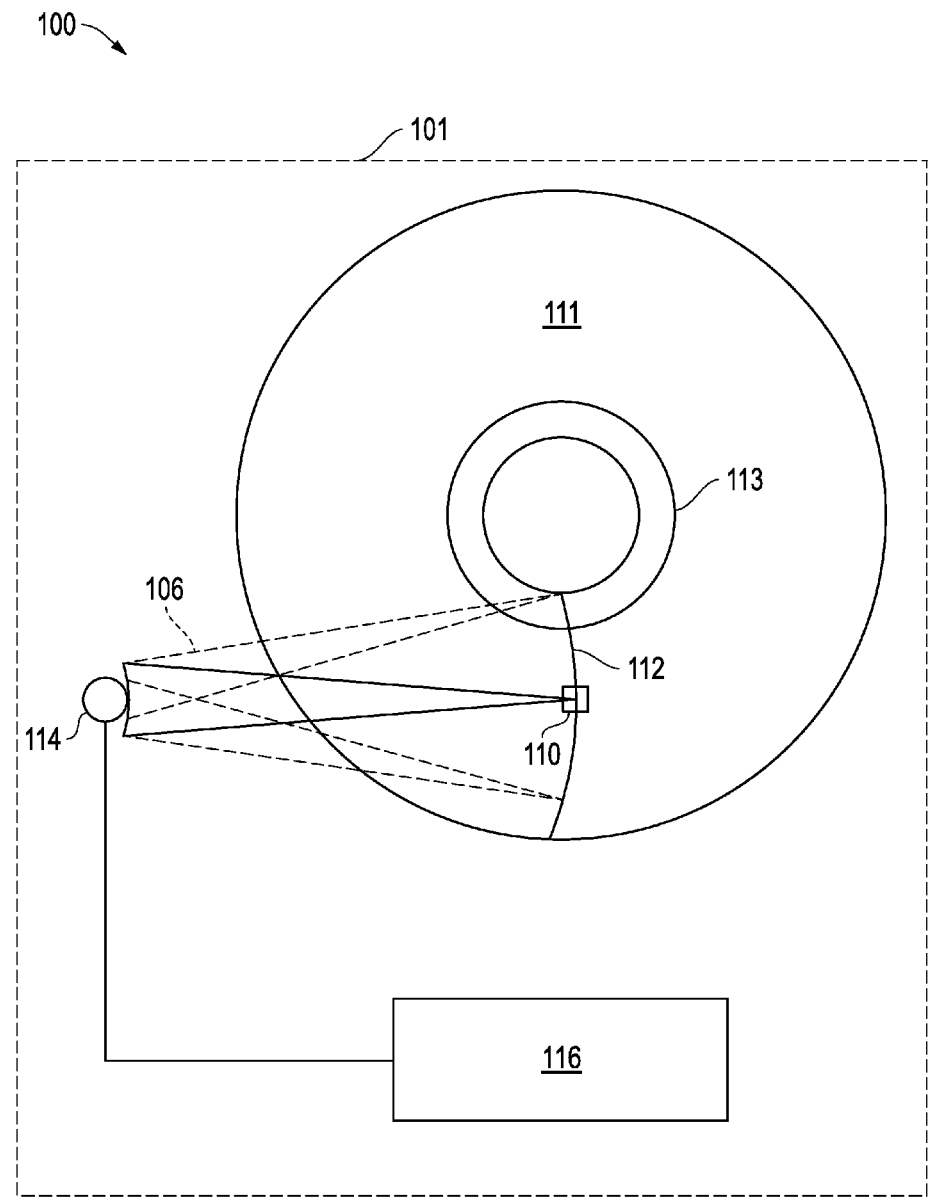
FIG. 6 is schematic plan view of an embodiment of a disk drive.

FIG. 6 depicts a hard disk drive assembly 100 comprising a housing or enclosure 101 with one or more media disks 111 rotatably mounted thereto. The disk 111 comprises magnetic recording media rotated at high speeds by a spindle motor (not shown) during operation. Disk 111 may be configured with overcoats as described herein. Concentric magnetic data tracks 113 are formed on either or both of the disk surfaces to receive and store information.

Embodiments of a read/write slider 110 having read/write heads may be moved across the disk surface by an actuator assembly 106, allowing the slider 110 to read and/or write magnetic data to a particular track 113. The actuator assembly 106 may pivot on a pivot 114. The actuator assembly 106 may form part of a closed loop feedback system, known as servo control, which dynamically positions the read/write slider 110 to compensate for thermal expansion of the magnetic recording media 111 as well as vibrations and other disturbances or irregularities. Also involved in the servo control system is a complex computational algorithm executed by a microprocessor, digital signal processor, or analog signal processor 116 that receives data address information from a computer, converts it to a location on the disk 111, and moves the read/write slider 110 accordingly.

In some embodiments of hard disk drive systems, read/write sliders 110 periodically reference servo patterns recorded on the disk to ensure accurate slider positioning. Servo patterns may be used to ensure a read/write slider 110 follows a particular track 113 accurately, and to control and monitor transition of the slider 110 from one track to another. Upon referencing a servo pattern, the read/write slider 110 obtains head position information that enables the control circuitry 116 to subsequently realign the slider 110 to correct any detected error.

Servo patterns or servo sectors may be contained in engineered servo sections 112 that are embedded within a plurality of data tracks 113 to allow frequent sampling of the servo patterns for improved disk drive performance, in some embodiments. In a typical magnetic recording media 111, embedded servo sections 112 may extend substantially radially from the center of the magnetic recording media 111, like spokes from the center of a wheel. Unlike spokes however, servo sections 112 form a subtle, arc-shaped path calibrated to substantially match the range of motion of the read/write slider 110.

Embodiments of disk overcoat bilayers have numerous advantages. They may comprise a Si-based diffusion barrier layer beneath a Ti-based oxidation barrier layer. The Si layer prevents diffusion of materials (e.g., Co) and protects against corrosion. The Ti layer prevents oxidation (e.g., $SiO_x$ formation) of the Si layer and also decreases the surface energy of the overcoat. The Ti layer is dense and hard, with a smooth flat surface that is chemically stable under high humidity and high temperature. Such bilayer combinations are stable under exposure to humidity, have lower surface energy and present higher diffusion barrier properties than conventional Si-based monolayer solutions.

In some embodiments, a magnetic media disk may comprise a substrate; a recording magnetic media on the substrate; and an overcoat on the recording magnetic media, the overcoat comprising a Si-based diffusion barrier layer on the recording magnetic media, and a Ti-based oxidation barrier layer on the Si-based layer. The Si-based layer may comprise amorphous SiN, TiSiN, SiC or SiCN, and the recording magnetic media may be Co-based or FePt-based. The Ti-based layer may comprise at least one of amorphous titanium oxide ($TiO_x$), oxynitride (TiON), titanium carbide (TiC), TiCO and TiCON.

In other embodiments, the overcoat may comprise a total thickness of about 20 Å to about 30 Å. For example, the Si-based layer and the Ti-based layer each may comprise a thickness of about 10 Å to about 15 Å. In some versions, the overcoat consists exclusively of a bilayer of the Si-based layer and the Ti-based layer. The overcoat may be an outermost layer of the magnetic media disk other than lubrication.

In still other embodiments, at least one of the Si-based layer and the Ti-based layer may contain nitrogen. For example, a content of the nitrogen may be graded in said at least one of the Si-based layer and the Ti-based layer, such that there is a lower nitrogen content near the recording magnetic media and a higher nitrogen content away from the recording magnetic media.

Embodiments of a hard disk drive may comprise an enclosure; a magnetic media disk rotatably mounted to the enclosure and having a substrate, a recording magnetic media on the substrate, and an overcoat on the recording magnetic media, the overcoat comprising a Si-based layer on the recording magnetic media, and a Ti-based layer on the Si-based layer; and an actuator pivotally mounted to the enclosure and having a head configured to read data from the magnetic media disk.

In another embodiment, an apparatus other than a magnetic media disk may comprise a substrate; a corrosive film on the substrate; and an overcoat on the corrosive film, the overcoat comprising a Si-based layer on the corrosive film, and a Ti-based layer on the Si-based layer.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A magnetic media disk, comprising:
a substrate;
a recording magnetic media on the substrate;
an overcoat on the recording magnetic media, the overcoat comprising a Si-based layer on the recording magnetic media, and a Ti-based layer on the Si-based layer; and wherein
the Si-based layer comprises at least one of amorphous SiN or TiSiN, and the Ti-based layer comprises amorphous TiON.

2. A magnetic media disk according to claim 1, wherein the overcoat comprises a total thickness of about 20 Å to about 30 Å.

3. A magnetic media disk according to claim 1, wherein the Si-based layer and the Ti-based layer each comprise a thickness of about 10 Å to about 15 Å.

4. A magnetic media disk according to claim 1, wherein the overcoat consists of a bilayer of the Si-based layer and the Ti-based layer.

5. A magnetic media disk according to claim 1, wherein a content of nitrogen is graded in at least one of the Si-based layer and the Ti-based layer, such that there is a lower nitrogen content near the recording magnetic media and a higher nitrogen content away from the recording magnetic media.

6. A magnetic media disk according to claim 1, wherein the overcoat is an outermost layer of the magnetic media disk other than lubrication.

7. A hard disk drive, comprising:
an enclosure;
a magnetic media disk rotatably mounted to the enclosure and having a substrate, a recording magnetic media on the substrate, and an overcoat on the recording magnetic media, the overcoat comprising a Si-based layer on the recording magnetic media, and a Ti-based layer on the Si-based layer;
an actuator pivotally mounted to the enclosure and having a head configured to read data from the magnetic media disk; and wherein
the Si-based layer comprises at least one of amorphous SiN or TiSiN, and the Ti-based layer comprises amorphous TiON.

8. A hard disk drive according to claim 7, wherein the overcoat consists of a bilayer of the Si-based layer and the Ti-based layer, and the overcoat comprises a total thickness of about 20 Å to about 30 Å.

9. A hard disk drive according to claim 7, wherein the Si-based layer and the Ti-based layer each comprise a thickness of about 10 Å to about 15 Å.

10. A hard disk drive according to claim 7, wherein a content of nitrogen is graded in at least one of the Si-based layer and the Ti-based layer, such that there is a lower nitrogen content near the recording magnetic media and a higher nitrogen content away from the recording magnetic media.

11. A hard disk drive, comprising:
an enclosure;
a magnetic media disk rotatably mounted to the enclosure and having a substrate, a recording magnetic media on the substrate, and an overcoat on the recording magnetic media, the overcoat comprising a Si-based layer on the recording magnetic media, and a Ti-based layer on the Si-based layer;
an actuator pivotally mounted to the enclosure and having a head configured to read data from the magnetic media disk; wherein
the Si-based layer comprises at least one of amorphous SiN or TiSiN, and the Ti-based layer comprises amorphous TiON;
the overcoat consists of a bilayer of the Si-based layer and the Ti-based layer, and the overcoat comprises a total thickness of about 20 Å to about 30 Å;
the Si-based layer and the Ti-based layer each comprise a thickness of about 10 Å to about 15 Å; and
both the Si-based layer and the Ti-based layer contain nitrogen, and a content of the nitrogen is graded such that there is a lower nitrogen content near the recording magnetic media and a higher nitrogen content away from the recording magnetic media.

* * * * *